United States Patent
Jin et al.

(10) Patent No.: US 12,539,497 B2
(45) Date of Patent: Feb. 3, 2026

(54) METHOD FOR PREPARING TUBULAR GRAPHENE COMPOSITE MEMBRANE

(71) Applicant: Nanjing University of Technology, Nanjing (CN)

(72) Inventors: Wanqin Jin, Nanjing (CN); Kang Huang, Nanjing (CN); Gongping Liu, Nanjing (CN)

(73) Assignee: Nanjing University of Technology, Nanjing (CN)

( * ) Notice: Subject to any disclaimer, the term of this patent is extended or adjusted under 35 U.S.C. 154(b) by 464 days.

(21) Appl. No.: 15/307,000

(22) PCT Filed: Aug. 27, 2014

(86) PCT No.: PCT/CN2014/085308
§ 371 (c)(1),
(2) Date: Oct. 27, 2016

(87) PCT Pub. No.: WO2015/131505
PCT Pub. Date: Sep. 11, 2015

(65) Prior Publication Data
US 2017/0266623 A1    Sep. 21, 2017

(30) Foreign Application Priority Data
Mar. 4, 2014 (CN) .......................... 201410076052.7

(51) Int. Cl.
*B01D 69/04* (2006.01)
*B01D 69/02* (2006.01)
(Continued)

(52) U.S. Cl.
CPC ............. *B01D 69/04* (2013.01); *B01D 69/02* (2013.01); *B01D 69/08* (2013.01); *B01D 69/108* (2022.08); *B01D 71/0211* (2022.08)

(58) Field of Classification Search
CPC .... B01D 67/0041; B01D 69/02; B01D 69/06; B01D 69/08; B01D 69/10; B01D 71/021
(Continued)

(56) References Cited

U.S. PATENT DOCUMENTS

2010/0184197 A1*  7/2010  Dong .................... C12M 21/02
                                                                         435/257.1
2015/0231577 A1*  8/2015  Nair ..................... B01D 71/024
                                                                           210/640

FOREIGN PATENT DOCUMENTS

CN           1164436 A      11/1997
CN          102908908 A  *   2/2013
(Continued)

OTHER PUBLICATIONS

R. R. Nair et al., DOI: 10.1126/science. 1211694,Science 335, 442 (2012); Unimpeded Permeation of Water Through Helium-Leak-Tight Graphene-Based Membranes.
(Continued)

*Primary Examiner* — Kelly M Gambetta
(74) *Attorney, Agent, or Firm* — PROI Intellectual Property US

(57) ABSTRACT

A method for preparing a graphene composite membrane on the surface of a tubular support. In the method, a tubular ceramic membrane is used as the support, a layer of graphene material is uniformly prepared on the surface of the support by vacuum suction, and the defect-free tubular graphene composite membrane is obtained by the drying process.

8 Claims, 2 Drawing Sheets

(51) Int. Cl.
  *B01D 69/08*   (2006.01)
  *B01D 69/10*   (2006.01)
  *B01D 71/02*   (2006.01)

(58) Field of Classification Search
  USPC .......................................................... 427/294
  See application file for complete search history.

(56) References Cited

FOREIGN PATENT DOCUMENTS

CN    103861469 A    6/2014
EP      2584067 A1    4/2013

OTHER PUBLICATIONS

Hyo Won Kim et al., DOI: 10.1126/science. 1236098; Science 342, 91 (2013); Selective Gas Transport Through Few-Layered Graphene and Graphene Oxide Membranes 1236686; Science 342, 95 (2013); Ultrathin, Molecular-Sieving Graphene Oxide Separation.
Hang Li et al., DOI: 10.1126/science. 1236686; Science 342, (2013); Ultrathin, Molecular-Sieving Graphene Oxide Membranes for Selective Hydrogen.

\* cited by examiner

METHOD FOR PREPARING TUBULAR GRAPHENE COMPOSITE MEMBRANE

TECHNICAL FIELD

The Invention belongs to the field of new material technology, relating to a method for preparing tubular graphene composite membrane, and particularly to a method for preparing a continuous defect-free graphene composite membrane on the surface of a tubular support.

BACKGROUND ART

With high yield of separation, low energy consumption and the characteristic of easy integration with catalytic reaction and other process combinations, membrane separation as a new and efficient separation technology recently has become an important means to solve the key problems concerning energies, resources and environment faced by modern human and an important part of development strategy to realize the economic sustainability. As the membrane separation is of a separation process based on materials, membrane material is a key element of the membrane separation technology.

Graphene is a two dimensional nano material, consisting of a graphite monolayer with the thickness of atomic layer. This kind of material has tremendous potential with various excellent properties. With strong electrical and thermal conductivities and mechanical strength, high carrier mobility and transmittance and huge specific area, the material shows a great application prospect in multiple fields such as transparent conducting thin film, electron device, energy storage, catalysis, biomedicine and separation, etc. In addition, as the derivatives of graphene material, sulfhydrylated graphene, oxidized graphene, hydroxylated graphene, aminated graphene and carboxylated graphene also show their attractive prospect in different fields for their different special functional groups.

Graphene and its derivatives have shown good prospects in recent years as the researches on the materials for preparing membrane have gained much attention (Science 335, 442 (2012), Science 342, 95 (2013), Science 342, 91 (2013)). However, the current graphene (and its derivative) membrane is mainly flat membrane prepared with the methods as filtration, spin-coating and dip-coating. There is no special method for preparing a tubular graphene (and its derivative) membrane yet. Tubular membrane has the characteristics as large loading density and simple operation. However, for the large surface curvature and long and thin shape of the tubular support, the tubular graphene composite membrane is difficult to be prepared with the methods as filtration, spin-coating and dip-coating. Therefore, it has a significant application prospect to develop a simple and easy method for preparing tubular graphene composite membrane, which is beneficial to the industrialized application of graphene materials.

SUMMARY OF THE INVENTION

The Invention provides a method for preparing tubular graphene composite membrane. In the method, a porous tubular ceramic membrane is used as a support and a layer of graphene material is uniformly prepared on the surface of the support through vacuum suction.

The technical scheme of the Invention is a method for preparing tubular graphene composite membrane; the specific steps are as follows:

(1) Preprocessing of a support: selecting a tubular ceramic membrane as a support; drying it after flushing with water; sealing one end of the support with a sealant and connecting the other end to a vacuum pump through a pipeline;

(2) Preparation of a membrane preparing solution: dissolving a graphene material into a solvent; obtaining a uniformly dispersed membrane preparing solution through ultrasonic processing;

(3) Preparation of membrane: immersing the tubular support processed in Step (1) in the membrane preparing solution; starting the vacuum pump and holding for 1-12 hours after the pressure is stabilized;

(4) Placing the prepared membrane in a vacuum drying oven and dry the membrane under 25° C.-50° C.

In Step (1), the tubular ceramic membrane is preferably a single tubular support, a multi-channel tubular support, a single tubular hollow fiber support, a multi-channel hollow fiber or a honeycomb ceramic support; the material of the ceramic support is preferably one or two of $ZnO_2$, $Al_2O_3$, $TiO_2$ or $ZrO_2$.

In Step (1), the sealant is preferably one of polyurethane sealant, phenolic resin sealant, silicone sealant, vulcanized silicone sealant, epoxy resin sealant or polyacrylic resin sealant.

In Step (2), the solvent is preferably one of water, ethyl alcohol, DMF, methyl alcohol or DMSO.

In Step (2), the solvent is preferably one of graphene, sulfhydrylated graphene, oxidized graphene, hydroxylated graphene, aminated graphene, or carboxylated graphene.

In Step (2), the concentration of the membrane preparing solution is preferably 0.001-1 mg/mL.

In Step (3), the stabilized pressure of the vacuum pump is preferably 100-2000 Pa.

Beneficial Effects:

The method provides a simple and easy way for preparing a continuous detect-free graphene composite membrane on the surface of a tubular support. The method has a universality for preparing all kinds of graphene derivative membranes. It makes full use of the performance advantages of the graphene material in membrane separation and has a significant meaning for large-scale graphene material application the field of membrane.

DETAILED DESCRIPTION OF THE PREFERRED EMBODIMENTS

The embodiments in combination with the technical scheme are as follows:

Embodiment 1

Figure 1:
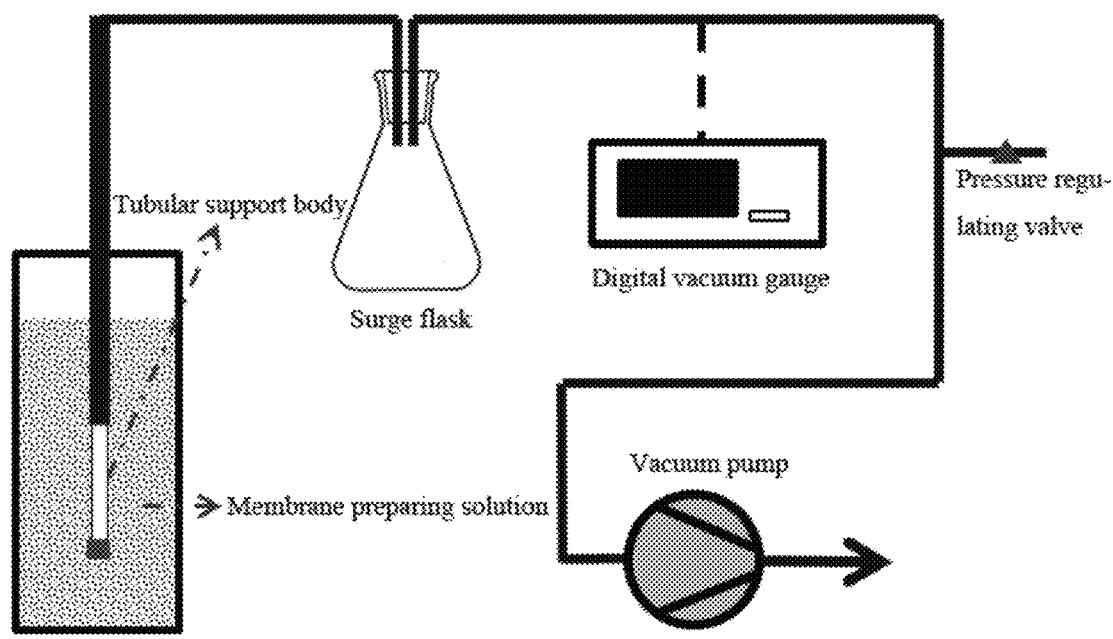
FIG. 1 is a schematic diagram of the membrane preparing device.
Figure 2:
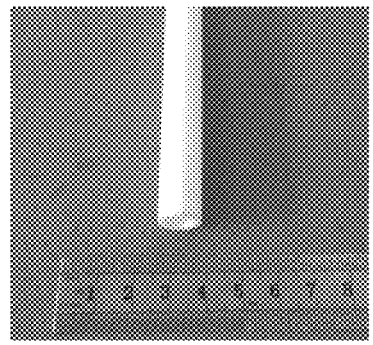
FIG. 2 is a picture of the real single tubular support in Embodiment 1.

Preparing a Graphene Membrane on the Surface of the Single Tubular Support with the Method Therein (1) Preprocessing of a support: selecting a single tubular ceramic membrane ($ZrO_2/Al_2O_3$) as a support (as shown in FIG. 2); drying it after flushing with water; sealing one end of the support with phenolic resin sealant and connecting the other end to a vacuum pump with a pipeline through a surge flask and a pressure regulating valve, as shown in FIG. 1.

(2) Preparation of a membrane preparing solution: dissolving the graphene into DMF with a concentration of 0.001 mg/mL; obtaining a uniformly dispersed membrane preparing solution through ultrasonic processing.

(3) Preparation of membrane: immersing the tubular support processed in Step 1 in the membrane preparing solution; starting the vacuum pump and holding for 12 hours after the pressure is stabilized at 1000 Pa.

(4) Placing the prepared membrane in a vacuum drying oven and drying the membrane under 40° C.

Through single component characterization for $H_2$, $N_2$, $CO_2$ and $CH_4$ of the graphene membrane, the result shows that the membrane has favorable hydrogen selectivity and the ideal selectivity of $H_2/N_2$, $H_2/CO_2$ and $H_2/CH_4$ reaches 67, 85 and 139 respectively.

Embodiment 2

Figure 3:
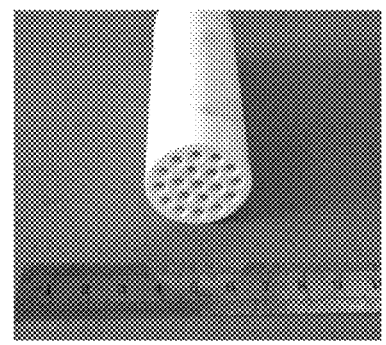
FIG. 3 is a picture of the real 19-channel tubular support in Embodiment 2.

Preparing a Animated Graphene Membrane on the Surface of the 19-Channel Tubular Support with the Method Therein (1) Preprocessing of a support: selecting a 19-channel tubular ceramic membrane ($TiO_2/Al_2O_3$) as a support (as shown in FIG. 3); drying it after flushing with water; sealing one end of the support with polyurethane sealant and connecting the other end to a vacuum pump through a pipeline, as shown in FIG. 1.

(2) Preparation of a membrane preparing solution: dissolving the aminated graphene into ethyl alcohol with a concentration of 0.03 mg/mL; obtaining a uniformly dispersed membrane preparing solution through ultrasonic processing.

(3) Preparation of membrane: immersing the tubular support processed in Step 1 in the membrane preparing solution; starting the vacuum pump and holding for 5 hours after the pressure is stabilized at 2000 Pa.

(4) Placing the prepared membrane in a vacuum drying oven and drying the membrane under 25° C.

Through single component characterization for $H_2$, $N_2$, $CO_2$ and $CH_4$ of the aminated graphene membrane, the result shows that the membrane has favorable $CO_2$ selectivity and the ideal selectivity of $CO_2/N_2$ and $CO_2/CH_4$ reaches 35 and 72 respectively.

Embodiment 3

Figure 4:
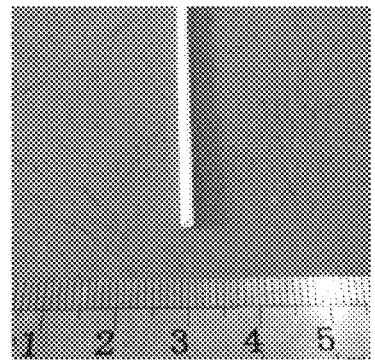
FIG. 4 is a picture of the real single tubular hollow fiber in Embodiment 3.

Preparing an Oxidized Graphene Membrane on the Surface of the Single Tubular Hollow Fiber ($Al_2O_3$) with the Method Therein (1) Preprocessing of a support: selecting a single tubular hollow fiber as a support (as shown in FIG. 4); drying it after flushing with water; sealing one end of the support with polyacrylic resin sealant and connecting the other end to a vacuum pump through a pipeline, as shown in FIG. 1.

(2) Preparation of a membrane preparing solution: dissolving the oxidized graphene into water with a concentration of 0.1 mg/mL; obtaining a uniformly dispersed membrane preparing solution through ultrasonic processing.

(3) Preparation of membrane: immersing the tubular support processed in Step 1 in the membrane preparing solution; starting the vacuum pump and holding for 3 hours after the pressure is stabilized at 100 Pa.

Figure 5:
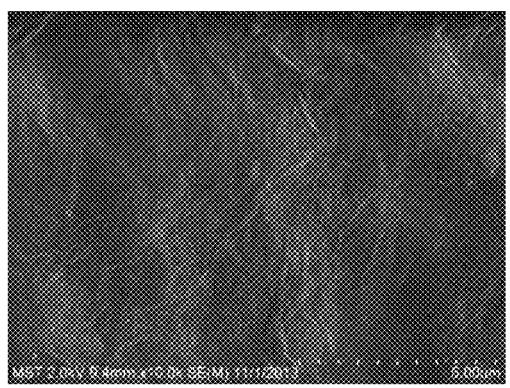
FIG. 5 is an electronic microscope photograph of the surface of the oxidized graphene membrane prepared in Embodiment 3.
Figure 6:
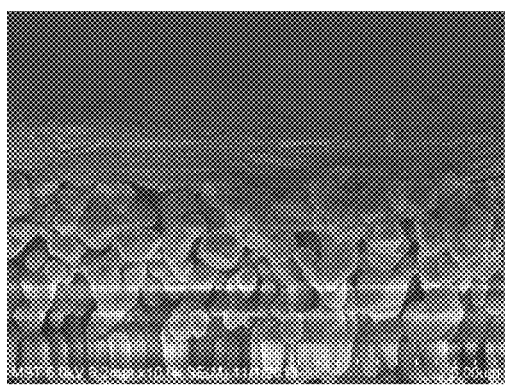
FIG. 6 is an electronic microscope photograph of the cross section of the oxidized graphene membrane prepared in Embodiment 3.

(4) Placing the prepared membrane in a vacuum drying oven and drying the membrane under 50° C. The electronic microscope photographs of the surface and cross section of the prepared oxidized graphene membrane are as shown in FIGS. 5 and 6. From the figures, it can be seen that the prepared graphene is of layer structure with a smooth and complete surface.

Figure 7:
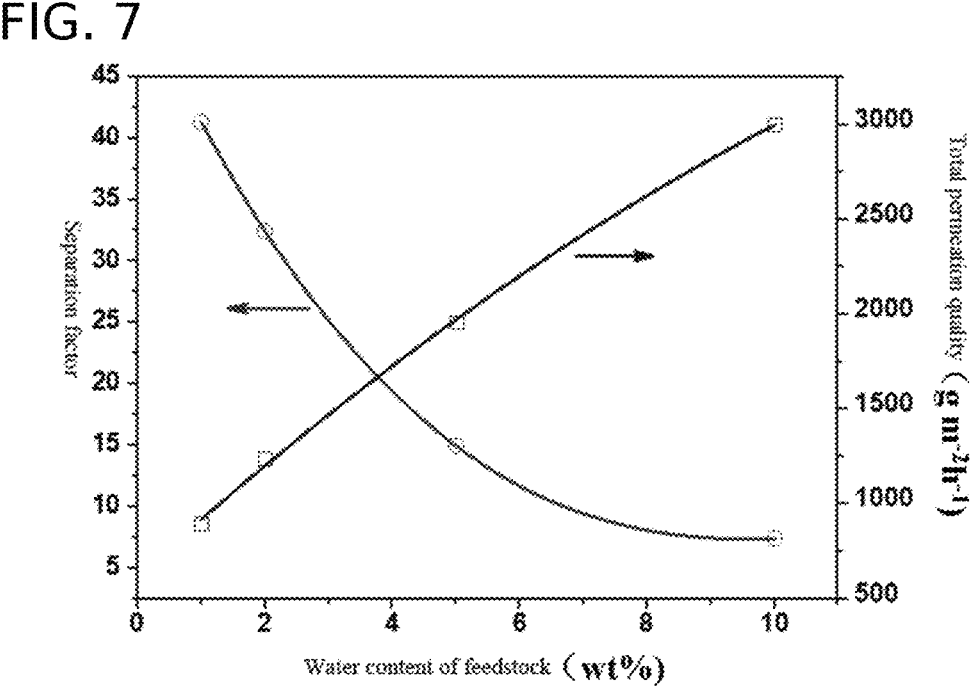
FIG. 7 is a result figure of methanol/water separation of the oxidized graphene membrane prepared in Embodiment 3.

Through methanol/water pervaporation characterization for oxidized graphene membrane, the result (in FIG. 7) shows that the membrane has favorable water permeability with a max. separation factor of 42.

Embodiment 4

Preparing a Carboxylated Graphene Membrane on the Surface of the Honeycomb Ceramic Support with the Method Therein (1) Preprocessing of a support: selecting a honeycomb ceramic ($ZnO_2$) as a support; drying it after flushing with water; sealing one end of the support with silicone sealant and connecting the other end to a vacuum pump through a pipeline, as shown in FIG. 1.

(2) Preparation of a membrane preparing solution: dissolving the hydroxylated graphene into DMSO with a concentration of 1 mg/mL; obtaining a uniformly dispersed membrane preparing solution through ultrasonic processing;

(3) Preparation of membrane: immersing the tubular support processed in Step 1 in the membrane preparing solution; starting the vacuum pump and holding for 1 hour after the pressure is stabilized at 500 Pa.

(4) Placing the prepared membrane in a vacuum drying oven and drying the membrane under 30° C.

Through ethyl alcohol/water pervaporation characterization for carboxylated graphene membrane, the result shows that the membrane has favorable water permeability with a max. separation factor of 63.

What is claimed is:

1. A method for preparing tubular graphene composite membrane through vacuum suction; the specific steps are as follows:
   (1) Preprocessing of a support: selecting a tubular ceramic membrane as a support; drying it after flushing with water; sealing one end of the support with a sealant and connecting the other end of the support to a vacuum pump with a pipeline through a surge flask and a pressure regulating valve;
   (2) Preparation of a membrane preparing solution: dissolving a graphene material into a solvent; obtaining a uniformly dispersed membrane preparing solution through ultrasonic processing;
   (3) Preparation of membrane: immersing the tubular support processed in Step (1) in the membrane preparing solution; starting the vacuum pump and holding for 1-12 hours after the pressure is stabilized;
   (4) Placing the prepared membrane in a vacuum drying oven and dry the membrane under 25° C.-50° C.

2. The method according to claim 1, wherein the tubular ceramic membrane support is a single tubular support, a multi-channel tubular support, a single tubular hollow fiber support, a multi-channel hollow fiber or a honeycomb ceramic support.

3. The method according to claim 1, wherein a material of the tubular ceramic membrane support is one or two of ZnO, $Al_2O_3$, $TiO_2$ or $ZrO_2$.

4. The method according to claim 1, wherein, the sealant is one of polyurethane sealant, phenolic resin sealant, silicone sealant, vulcanized silicone sealant, epoxy resin sealant or polyacrylic resin sealant.

5. The method according to claim 1, wherein, the solvent is one of water, ethyl alcohol, DMF, methyl alcohol or DMSO.

6. The method according to claim 1, wherein, the graphene material is one of graphene, sulfhydrylated graphene, oxidized graphene, hydroxylated graphene, aminated graphene, or carboxylated graphene.

7. The method according to claim 1, wherein, the concentration of the membrane preparing solution is 0.001-1 mg/mL.

8. The method according to claim 1, wherein, the pressure of the vacuum pump is 100-2000 Pa.

* * * * *